(12) United States Patent
Holaus

(10) Patent No.: US 12,322,947 B2
(45) Date of Patent: Jun. 3, 2025

(54) COMPACT UNDERGROUND GIS FOR HIGH-VOLTAGE GAS-INSULATED SUBSTATION (GIS), BUSBARS AND LINES (GIL)

(71) Applicant: Hivoduct AG, Kemptthal (CH)

(72) Inventor: Walter Holaus, Glattfelden (CH)

(73) Assignee: Hivoduct AG, Kemptthal (CH)

( * ) Notice: Subject to any disclaimer, the term of this patent is extended or adjusted under 35 U.S.C. 154(b) by 268 days.

(21) Appl. No.: 18/015,170

(22) PCT Filed: Jul. 21, 2020

(86) PCT No.: PCT/EP2020/070546
§ 371 (c)(1),
(2) Date: Jan. 9, 2023

(87) PCT Pub. No.: WO2022/017585
PCT Pub. Date: Jan. 27, 2022

(65) Prior Publication Data
US 2023/0253774 A1    Aug. 10, 2023

(51) Int. Cl.
| | |
|---|---|
| *H02G 5/06* | (2006.01) |
| *H02G 5/00* | (2006.01) |
| *H02G 9/06* | (2006.01) |
| *H02G 9/08* | (2006.01) |

(52) U.S. Cl.
CPC ............. *H02G 5/063* (2013.01); *H02G 5/002* (2013.01); *H02G 9/065* (2013.01); *H02G 9/08* (2013.01)

(58) Field of Classification Search
CPC .......... H02G 5/06; H02G 5/002; H02G 5/063; H02G 9/065; H02G 9/08

USPC .............................................................. 174/8
See application file for complete search history.

(56) References Cited

U.S. PATENT DOCUMENTS

| | | | |
|---|---|---|---|
| 3,361,870 | A | 1/1968 | Whitehead |
| 3,767,837 | A | 10/1973 | Graybill |
| 5,530,200 | A | 6/1996 | Thuries et al. |

FOREIGN PATENT DOCUMENTS

| | | |
|---|---|---|
| CN | 1104800 A | 7/1995 |
| CN | 208723468 U | 4/2019 |
| DE | 2316100 A1 | 10/1974 |
| DE | 102008030997 A1 | 12/2009 |
| FR | 2642578 A1 | 8/1990 |
| FR | 2998426 A1 | 5/2014 |

OTHER PUBLICATIONS

Written Opinion by the ISA for PCT/EP2020/070546 mailed Apr. 7, 2021 (Entire Document).

*Primary Examiner* — Tremesha W Burns
(74) *Attorney, Agent, or Firm* — GrowIP Law Group LLC

(57) ABSTRACT

The invention relates to a modular and compact arrangement (200) of three phases (A, B, C) of a gas-insulated apparatus (100), that is suitable for placement inside a tunnel or a pipe (106) or another confined space. According to the invention, the three phases (A, B, C) are arranged in a triangle or side-by-side on a fixation part (103, 104) which includes a roller system (105; 105*a*, 105*b*, 105*c*, 105*d*). This allows the insertion of such a three-phase assembly (100) into confined spaces such as pipes or tunnels (106), without the need for access by workers or machinery. Furthermore, the present disclosure relates to a method for assembling and installing such a three-phase arrangement (100) into the confined space (106).

29 Claims, 10 Drawing Sheets

COMPACT UNDERGROUND GIS FOR HIGH-VOLTAGE GAS-INSULATED SUBSTATION (GIS), BUSBARS AND LINES (GIL)

CROSS-REFERENCE TO RELATED APPLICATIONS

This application is a U.S. National Stage Application that claims the benefit of the filing date of International PCT Application No. PCT/EP2020/070546, filed on Jul. 21, 2020, that is hereby incorporated by reference in its entirety.

FIELD OF THE INVENTION

The present disclosure relates to the field of high-voltage and medium-voltage gas-insulated switchgear (GIS), gas-insulated busbars and gas-insulated lines (GIL). A modular and compact arrangement of three phases of a gas-insulated apparatus is disclosed, that is suitable for placement inside a tunnel or a pipe or another confined space. Furthermore, the present disclosure relates to a method for assembling and installing such a three-phase arrangement into the confined space.

BACKGROUND OF THE INVENTION

JP9121437A2 was first published on Jun. 5, 1997 in the name of Hitachi Ltd. It relates to a gas-insulated transmission line (GIL) in a large circular tunnel. Two linearly arranged three-phase single-phase-encapsulated GILs are fixedly installed in the tunnel. A trench is provided in the center of the tunnel floor. It serves for providing a work space and equipment storage space for personnel. The trench may also prevent water infiltration of equipment in the tunnel, may be used to store or install a further GIL, and may house an exhaust pipe and a water distribution pipe. A transfer carriage for installing GIL enclosures is movable on the floor above the trench.

JP51685, first published 1976, also discloses a large accessible circular tunnel that serves for installing and housing electric cables. The tunnel contains multiple three-phase triangular cable systems arranged in two vertical stacks. The tunnel is cooled via hoses that are connected to a cooling system.

CN10620781A was first published on Jul. 12, 2016 in the name of China Western Electric Co. It relates to installation methods for rigid gas-insulated transmission lines (GIL) in large half-circular tunnels having rails for movement of transport vehicles and of mounting vehicles equipped with support arms for supporting and moving the GIL. During installation, wheels provide relative movement between the transport and mounting vehicles and a transfer cart and further between the transfer cart and the GIL. These wheels are blocked during transportation of the GIS on the transport and mounting vehicles through the tunnel.

CN203933009U was first published on May 11, 2014 in the name of National Grid Corporation et al. It relates to an AC ultra-high-voltage cross-river power transmission system in a large accessible tunnel. The GIL can be installed in a straight line or in a vertical V-shaped line. In the V-shaped line, two sections of the GIL are connected by elbows. The GIL is filled with $SF_6$ gas or $SF_6/N_2$ gas mixture or compressed air. Pipeline wells are positioned on both water banks and can be in the form of vertical or inclined wells.

In the known tunnel installations, the three phases may be placed on the sides of the tunnel (one above each other); at the bottom of the tunnel (e.g. above pavement or below pavement) or on top of the tunnel (enabling access for people or machinery on ground), and additional space for personnel is provided inside the tunnel. Therefore, much space is needed and contributes to the cost of building the tunnel, which increases with the square of the tunnel diameter. Rectangular tunnels can be used for side-by-side arrangements of three phases. Again, much space is needed for providing personnel with equal access to each phase during installation, maintenance or repair of the gas-insulated line.

SUMMARY OF THE INVENTION

Therefore, it is an object of the invention to provide an improved gas-insulated line or line-segment module thereof, which is particularly suitable for arrangement in a tunnel and allows to keep the required space for accessibility, assembly, disassembly and maintenance of the gas-insulated line to a minimum.

These objects are achieved by the subject-matter of the independent claims. Some embodiments as given in the dependent claims and claim combinations provide further improvements.

According to the invention, a gas-insulated line has a longitudinal axis, comprises phases with single-phase enclosures that are aligned parallel to one another, and is segmented into line segments having a segment length, wherein at least one of the line segments comprises: at least one holding means arranged at at least one longitudinal position of the line segment for holding the single-phase enclosures of the line segment relative to one another, thereby mounting the single-phase enclosures of the line segment together and forming a unitary line-segment module.

Such a gas-insulated line has various advantages over known systems. By forming line-segment modules directly from a holding means and three singe-phase enclosures very compact modules can be created. Such line-segment modules can have reduced lateral or radial space requirement and can easily fit e.g. into narrow confined spaces such as pipes or tunnels. Furthermore, the provision of unitary line-segment modules allows to create units, that are separately handable and movable, e.g. on the construction site or inside an installation pipe or tunnel. The unitary line-segment modules are mechanically stable, in particular in length direction, for being pushed into or dragged out of a pipe or tunnel. This largely simplifies the construction of gas-insulated lines and their installation in confined spaces such as underground pipes or tunnels. In addition, the confined space can be reduced in size and less time and cost for groundwork is needed.

Very good results can be achieved by providing a first holding means at a first longitudinal position of the line segment for holding the single-phase enclosures of the line segment relative to one another at the first longitudinal position, a second holding means at a second longitudinal position of the line segment for holding the single-phase enclosures of the line segment relative to one another at the second longitudinal position, and thereby mounting the single-phase enclosures of the line segment together and forming the unitary line-segment module. This further improves the mechanical stability of the unitary line-segment module.

Very good results can be achieved by providing the line-segment module with moving means for facilitating movement of the line-segment module, in particular by exerting a pushing or dragging force onto the line-segment module at a longitudinal end position of the line-segment module. In particular, the moving means comprise or are rollers for supporting and moving, in particular pushing or dragging, the line-segment module.

In embodiments, the moving means can be arranged in each holding means and/or can be adapted to support and allow rolling the line-segment module in the confined space, in particular a confined space that is not accessible for personnel in upright position or is inaccessible to personnel.

In embodiments, the moving means, in particular rollers, can be mounted in each holding means such that an outer contour of the moving means is adapted to a bottom of a confined space, in particular adapted to a rounded bottom of a pipe or a flat bottom of a tunnel.

In embodiments, the moving means, in particular a first roller and a second roller in each holding means, can be mounted permanently on the line-segment module. Furthermore, the moving means can be mounted for: inserting the line-segment module into the confined space during installation, and/or for removing the line-segment module out of the confined space for maintenance or repair, and/or for compensating thermal expansion during operation of the gas-insulated line.

In embodiments, the gas-insulated line can comprise three phases with single-phase enclosures, wherein the holding means, in particular the first and second holding means, hold the three phases in a triangular arrangement.

In embodiments, the gas-insulated line can comprise three phases with single-phase enclosures, and the holding means, in particular the first and second holding means, hold the three phases in a linear arrangement.

In embodiments, each single-phase enclosure of the gas-insulated line can comprise a first enclosure tube and a second enclosure tube, both having a longitudinal axis and a radial thickness, and therebetween a connection portion for providing a gas-tight connection between a first end of the first enclosure tube and a second end of the second enclosure tube, wherein the connection portion provides a sealing element between the first end and the second end in such a manner that a gas-escape path is sealed in a gas-tight manner, the gas-escape path is formed between the first end and the second end and starts at an inside of the first and second enclosure tube and ends at an outside of the first and second enclosure tube, the gas-escape path has a first segment running along a direction having a directional component parallel to the longitudinal axis, and the sealing element is provided in the first segment.

Such designs allow to prolong the gas-escape paths, or the gas-escape paths which are minimal in radial direction (when seen in the central length cross section of the enclosure), between the ends of the enclosure tubes and thereby to improve the sealing without increasing the radial extent of the integrated flange design. Furthermore, the partially axial orientation of the gas-escape path can allow to provide plural sealing rings in series along the gas-escape path.

In embodiments, thermal expansion of the gas-insulated line in particular during operation can be compensated by providing: a first longitudinal fixation position, in particular first end position, at which the gas-insulated line is fixedly mounted to a first reference location, a second longitudinal fixation position, in particular second end position, at which the gas-insulated line is fixedly mounted to a second reference location, there-between a length compensation element being arranged in the gas-insulated line, in particular between two line-segment modules, and the moving means, in particular rollers, of the line-segment modules, which are arranged between the first and second longitudinal fixation positions, being unblocked for allowing for movements due to thermal expansion or contraction of the gas-insulated line between the first and second longitudinal fixation positions.

In embodiments, a flexible-angle unit is present in the gas-insulated line, in particular between two line-segment modules, to provide a non-straight gas-insulated line.

The invention also relates to a line-segment module for a gas-insulated line, in particular for a gas-insulated line as disclosed herein, the line-segment module having a segment length and comprising: phases encapsulated by single-phase enclosures that are aligned with one another, at least one holding means arranged at at least one longitudinal position of the line-segment module for holding the single-phase enclosures of the line segment relative to one another, thereby mounting the single-phase enclosures together to make a unitary line-segment module.

In embodiments of the line-segment module, the holding means can be or comprise: a first holding means at a first longitudinal position of the line-segment module for holding the single-phase enclosures relative to one another at the first longitudinal position, a second holding means at a second longitudinal position of the line-segment module for holding the single-phase enclosures relative to one another at the second longitudinal position, and thereby mounting the single-phase enclosures of the line segment together and forming the unitary line-segment module.

In embodiments, the line-segment module can comprise or be at least one of: gas-insulated busbar; gas-insulated connection element; gas-insulated switchgear (GIS) such as disconnectors, circuit breakers; or other electrical component.

In another aspect, the invention relates to a system comprising a gas-insulated line having line-segment modules, in particular a gas-insulated line as disclosed herein, and a confined space providing a volume for accommodating the gas-insulated line.

In embodiments of the system, the confined space is connected to at least one manhole that is or are accessible by personnel for installing, maintaining and/or removing line-segment modules.

In embodiments of the system, the at least one manhole is at a starting position, an end position, and/or an intermediate position of the gas-insulated line and has a manhole length that is larger than the segment length of the line-segment module, in particular the manhole length being larger than 6 m or 8 m or 10 m.

In embodiments of the system, the gas-insulated line is in a multi-lateral arrangement of the phases, preferably a star-shaped triangular arrangement three phases, in particular as disclosed herein, and the confined space has a clear cross section having an at least partially rounded shape, e.g. an arched tunnel, or an at least partially circular shape, e.g. a circular pipe.

In other embodiments of the system, the gas-insulated line is in a linear arrangement of at least three phases, in particular a linear arrangement of three phases and optionally a reserve phase as disclosed herein, and the confined space has a clear cross section having a flat bottom.

In embodiments of the system, first critical transverse dimensions, in particular an inner diameter or inner height or inner width, of a clear cross section of the confined space is larger than second critical transverse dimensions, in particular an outer diameter or outer height or outer width, of a cross section of the gas-insulated line by less than 50%, preferred less than 30%, more preferred less than 20%, most preferred less than 10% of the cross section of the gas-insulated modules. In particular, the first critical transverse dimension, in particular an inside diameter of the confined space, is approximately 0.5 m for a 100 kV gas-insulated line and approximately 1.2 m for a 550 kV gas-insulated line.

In a further aspect, the invention relates to a method for installing a gas-insulated line, in particular a gas-insulated line as disclosed herein, in a confined space, the gas-insulated line having a longitudinal axis, comprising phases with single-phase enclosures and being segmented into line segments, the method comprising the method elements of:
  a. aligning three single-phase enclosures of a line segment,
  b. fixing the three single-phase enclosures together by at least one holding means, in particular by a first holding means at a first longitudinal position of the line segment and by a second holding means at a second longitudinal position of the line segment, thereby forming a unitary line-segment module, and
  c. connecting the line-segment module to an end of an already assembled portion of the gas-insulated line arranged in a confined space, e.g. a pipe or tunnel.

In embodiments, the method element c. comprises the method elements d. and e.:
  d. inserting a formed or machined end of the line-segment module into a formed or machined end of the already assembled portion of the gas-insulated line for providing a flange-connection, and
  e. securing the flange-connection by an elastically openable and closable bracket, and optionally securing the bracket by a securing bar and/or a heat shrink tube.

In embodiments, the method comprises the method elements of:
  f. filling a gas volume of the three single-phase enclosures with an insulation gas at an elevated gas pressure, in particular air, $SF_6$, an alternative gas or gas mixtures, or a combination thereof at an over-pressure in a range of 3 bar to 8 bar.

In embodiments, the method comprises the method elements of:
  g. arranging a supply duct on top of the line-segment module and connecting it to a mating end of a supply duct of the already assembled portion of the gas-insulated line, and/or
  h. providing moving means, in particular rollers, permanently mounted on the at least one holding means.

In embodiments, the method comprises the method elements of:
  i. moving or rolling the gas-insulated line (100) with the connected line-segment module (102) by a pushing or dragging force into the confined space (106), and in particular
  j. repeating steps a. to i.

In embodiments, the method can also comprise method elements of de-installing the gas-insulated line, e.g. by performing the method elements a. to i. in a reversed manner.

In embodiments of the method, the moving means, in particular rollers, are used for at least one of: inserting the line-segment module into the confined space during installation, removing the line-segment module out of the confined space for maintenance or repair, and compensating thermal expansion after installation or during operation of the gas-insulated line.

In this application, the terms "radial", "axial", "central length cross section", circumferential" refer to a longitudinal axis z of the enclosure, or in other words to a substantially cylindrical shape or symmetry of the enclosure.

It is to be understood that both the foregoing general description and the following detailed description present embodiments with optional features, and are intended to provide an overview or framework for understanding the nature and character of the disclosure. The accompanying drawings are included to provide a further understanding, and are incorporated into and constitute a part of this specification.

The drawings illustrate various embodiments, and together with the description serve to explain in examples the principles and operation of the concepts disclosed.

BRIEF DESCRIPTION OF THE DRAWINGS

The herein described invention will be more fully understood from the detailed description given herein below and the accompanying drawings which should not be considered limiting to the invention described in the appended claims. The drawings are showing various embodiments, namely in:

DESCRIPTION OF THE EMBODIMENTS

Reference will now be made in detail to certain embodiments, examples of which are illustrated in the accompanying drawings, in which some, but not all features are shown. Embodiments disclosed herein may be embodied in many different forms and should not be construed as being limiting; rather, these embodiments are provided so that this disclosure will satisfy applicable legal requirements. Whenever possible, like reference numbers will be used to refer to like components or parts.

Figure 1:
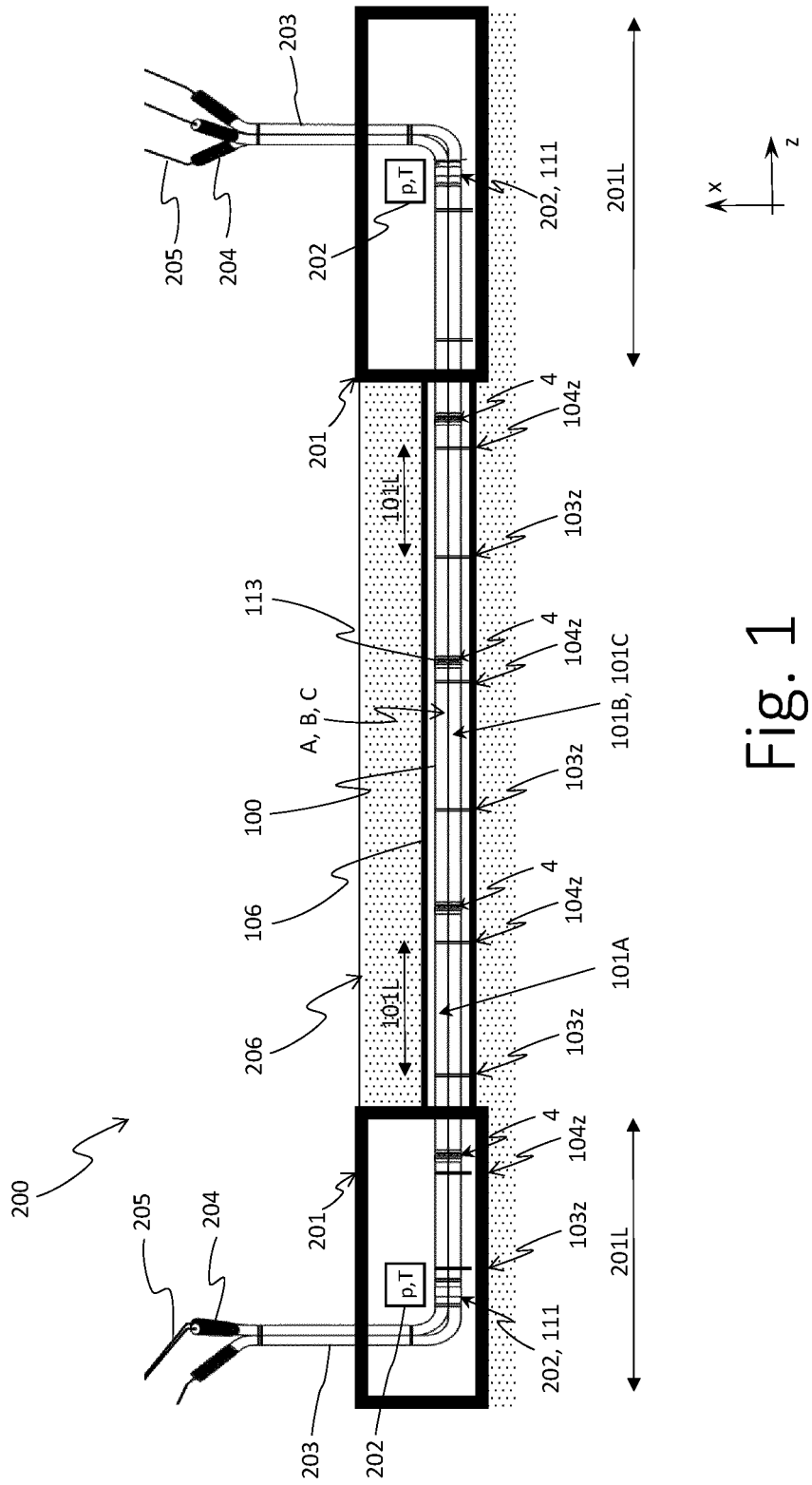
FIG. 1 a cross-sectional length view of a system comprising a gas-insulated line in a multilateral, in particular triangular, arrangement of phases arranged inside an underground tube.
Figure 2:
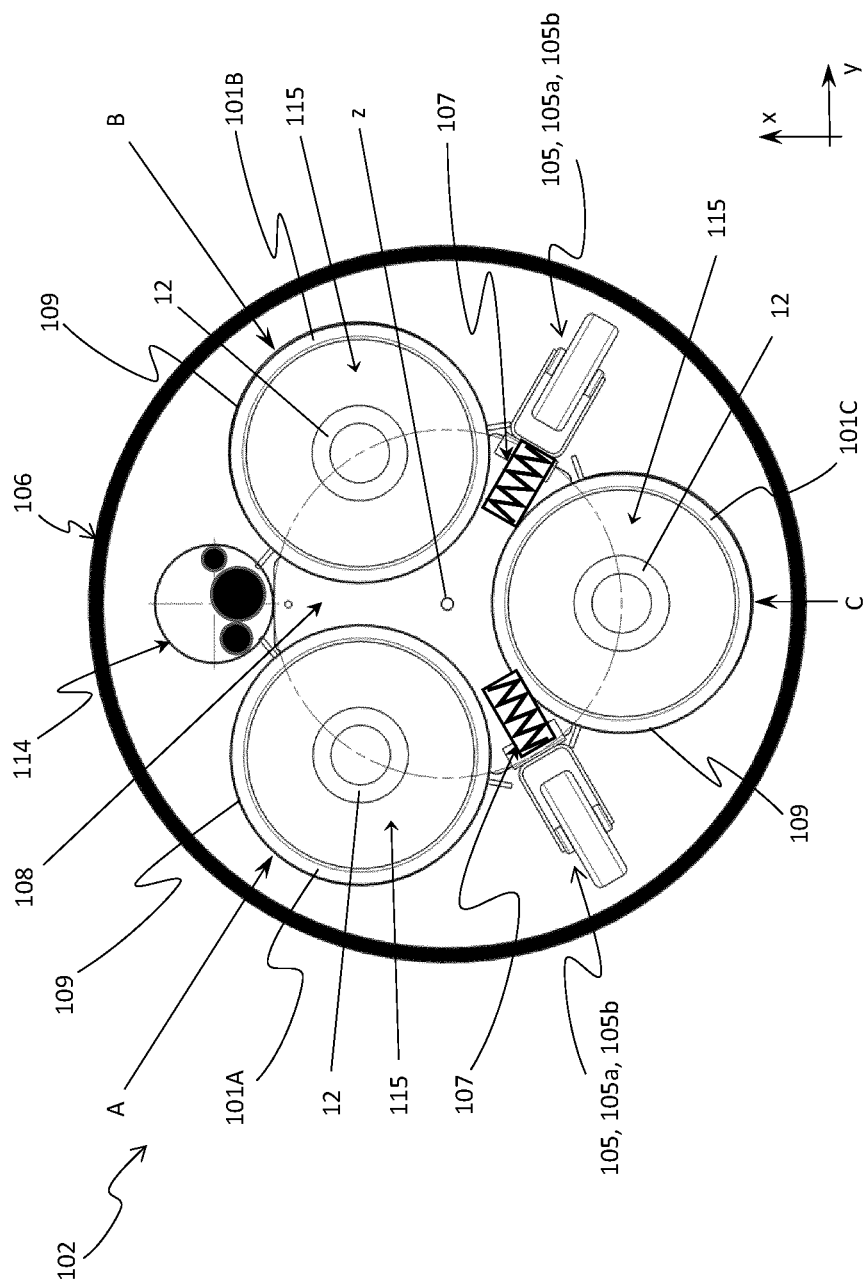
FIG. 2 a cross-sectional view of a triangular arrangement of three single-phase-encapsulated gas-insulated lines and a supply duct arranged in a tube.
Figure 3:
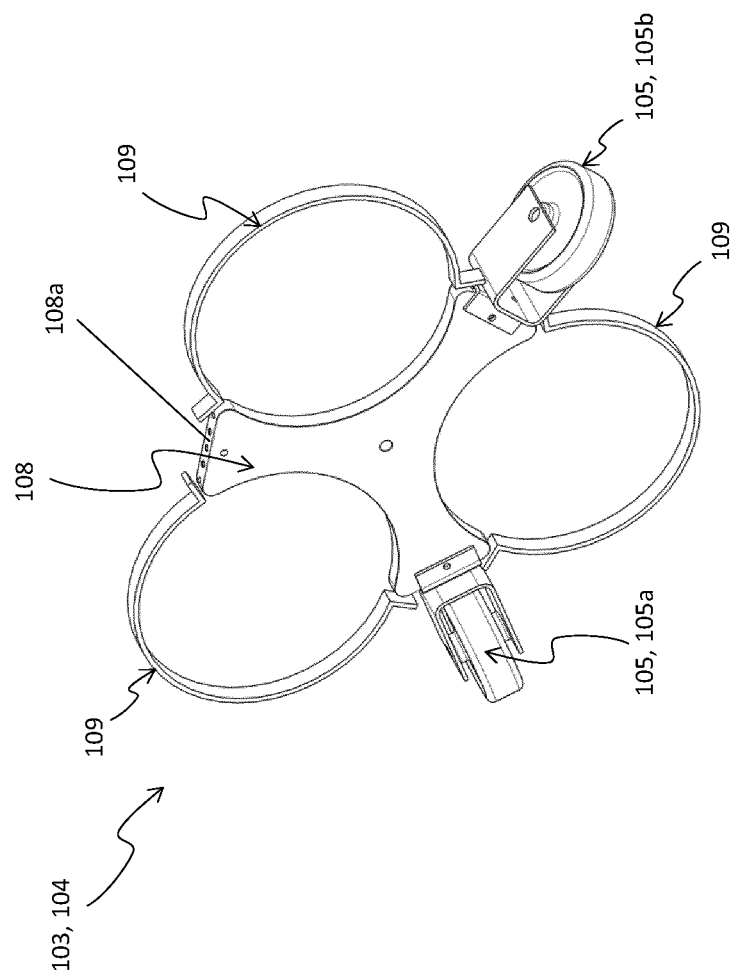
FIG. 3 a perspective view of a triangular fixation with a three-phase fixation element and rollers.
Figure 4:
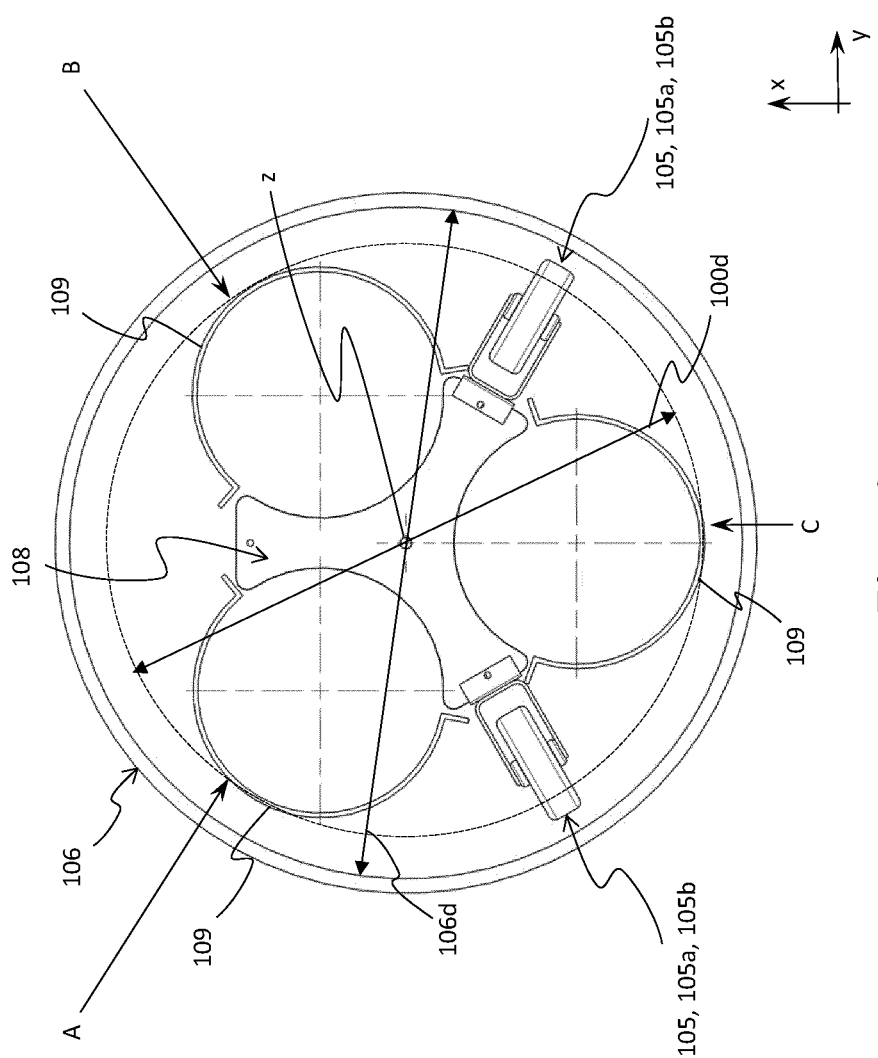
FIG. 4 a front view of the embodiment of FIG. 3 in a tube.

FIG. 1 shows a lengthwise cross-sectional overview of a system 200 comprising a single-phase-encapsulated gas-insulated line 100, in particular a straight busbar duct 100 thereof, arranged in a tunnel or pipe 106. The gas-insulated line 100, or generally gas-insulated apparatus 100, have single phase enclosures that can be in a multilateral arrangement, e.g. in a triangular star arrangement 101A, 101B, 101C of three phases A, B, C as shown in FIG. 2, or alternatively in a quadrilateral arrangement of phases (not shown) comprising three (active) phases A, B, C and a reserve phase, or in a pentagonal arrangement (not shown)

comprising three (active) phases A, B, C, a reserve phase and an additional space for receiving a supply duct for other media.

In embodiments, even more phases, e.g. in a double busbar configuration, are possible and can be arranged in the tunnel or pipe 106. For example, six or seven phases (e.g. including a reserve phase) can be arranged in a pentagon or hexagon (i.e. largely on a circle) and/or with an additional phase in the center for installation in a pipe. Alternatively, six or seven phases can be arranged in a linear side-by-side arrangement or in two triangular arrangements arranged side-by-side in a more flat tunnel.

FIG. 1 is now discussed in connection with FIG. 2. The single-phase enclosures 101A, 101B, 101C are separately gas-tight and preferably made from metal. Each enclosure 101A, 101B, 101C houses a central conductor 12 that is suspended in its insulation gas compartments 13.

The gas-insulated line 100 can have a longitudinal axis z, which may be straight or may include certain bents in horizontal and/or vertical direction, depending on need or shape of the tunnel or pipe 106. The gas-insulated line 100 can comprise three electrical phases A, B, C with single-phase enclosures 101A, 101B, 101C, which are aligned parallel to one another and are segmented into line segments 101 having a segment length 101L. A least one and preferably each line segment 101 can comprise at least one holding means 103, 104 arranged at a longitudinal position 103z, 104z of the line segment 101 for holding the single-phase enclosures 101A, 101B, 101C of the line segment 101 relative to one another. Preferably, a first holding means 103 can be arranged at a first longitudinal position 103z of the line segment for holding the single-phase enclosures 101A, 101B, 101C of the line segment 101 relative to one another at the first longitudinal position 103z, and a second holding means 104 can be arranged at a second longitudinal position 104z of the line segment 101 for holding the single-phase enclosures 101A, 101B, 101C of the line segment 101 relative to one another at the second longitudinal position 104z. This allows to mount the single-phase enclosures 101A. 101B, 101C of the line segment 101 together and to form a unitary line-segment module 102.

The single-phase enclosures 101A, 101B, 101 C are preferably made from metal and are separately gas-tight and lengthwise segmented. Each enclosure 101A, 101B, 101C houses a central conductor 12 that is suspended in an insulation gas compartment 13. Thus, each line-segment module 102 forms a fully functional section of the gas-insulated line 100. The gas compartments 13 enclosed by the enclosures 101A, 101B, 101C are filled with an insulation gas at elevated pressure. Specifically, technical air (80% N2, 20% O2) as insulation gas can be used. Typical insulation gas pressures are in a range of 3 bar to 10 bar.

As shown in FIG. 2, the three phases A, B, C can be arranged in a triangular setup and preferably on the same distance from the center z of the pipe 106. The pipe diameter is slightly bigger than the outside diameter of the three phases A, B, C arranged in triangular shape.

As shown in FIGS. 2 to 5, each holding means 103, 104, in particular the first and second holding means 103 and 104, can comprise a triangular fixation element 108, in particular triangular fixation plate 108, that is shaped and arranged to fit in an intermediate volume between the single-phase enclosures 101A, 101B, 101C and provides mounting means 108a for mounting phase fixation elements 109 and/or for mounting the moving means 105 thereon.

Figure 9:
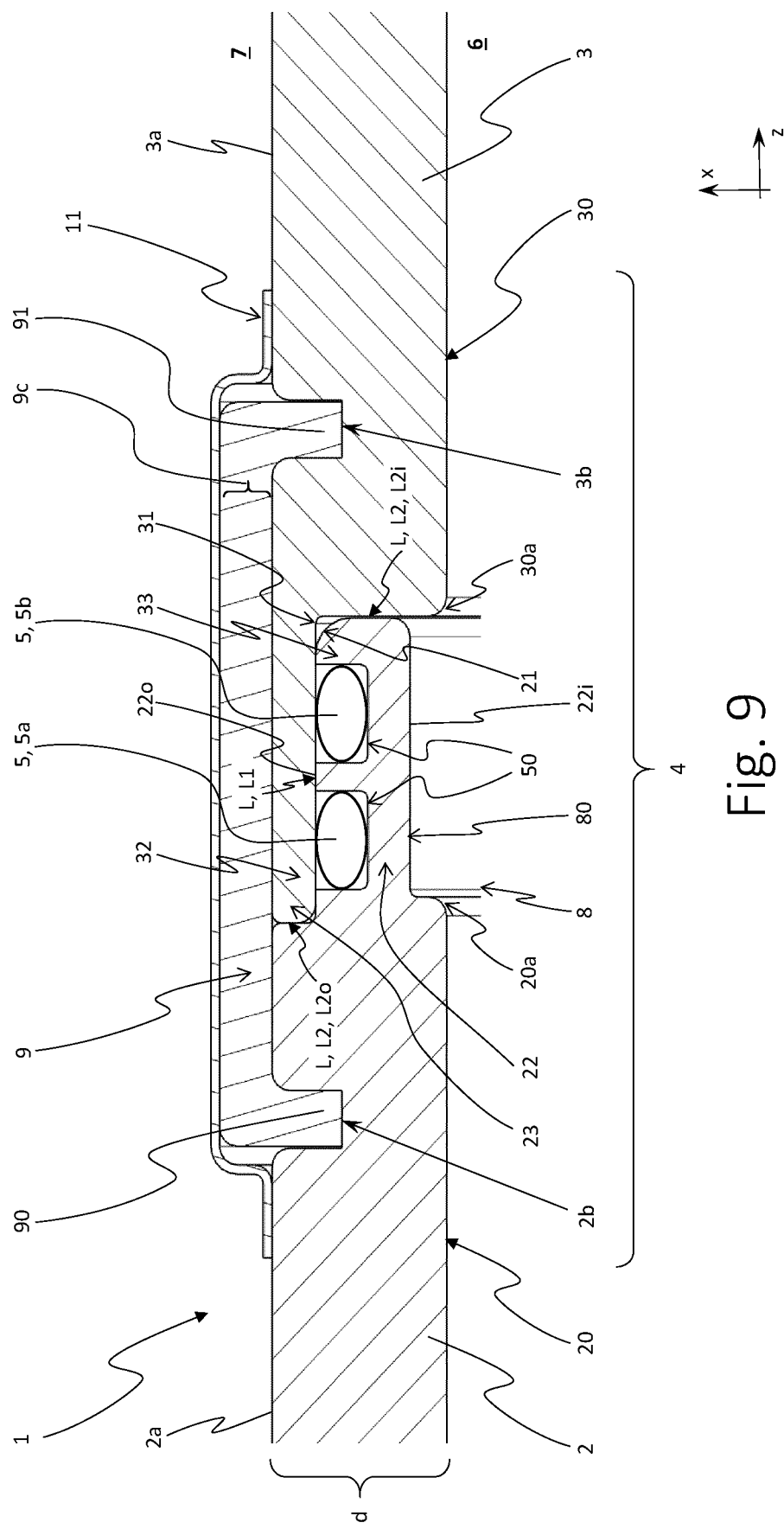
FIG. 9 a detail view showing a partial cross-sectional length view of an integrated flange design.
Figure 10:
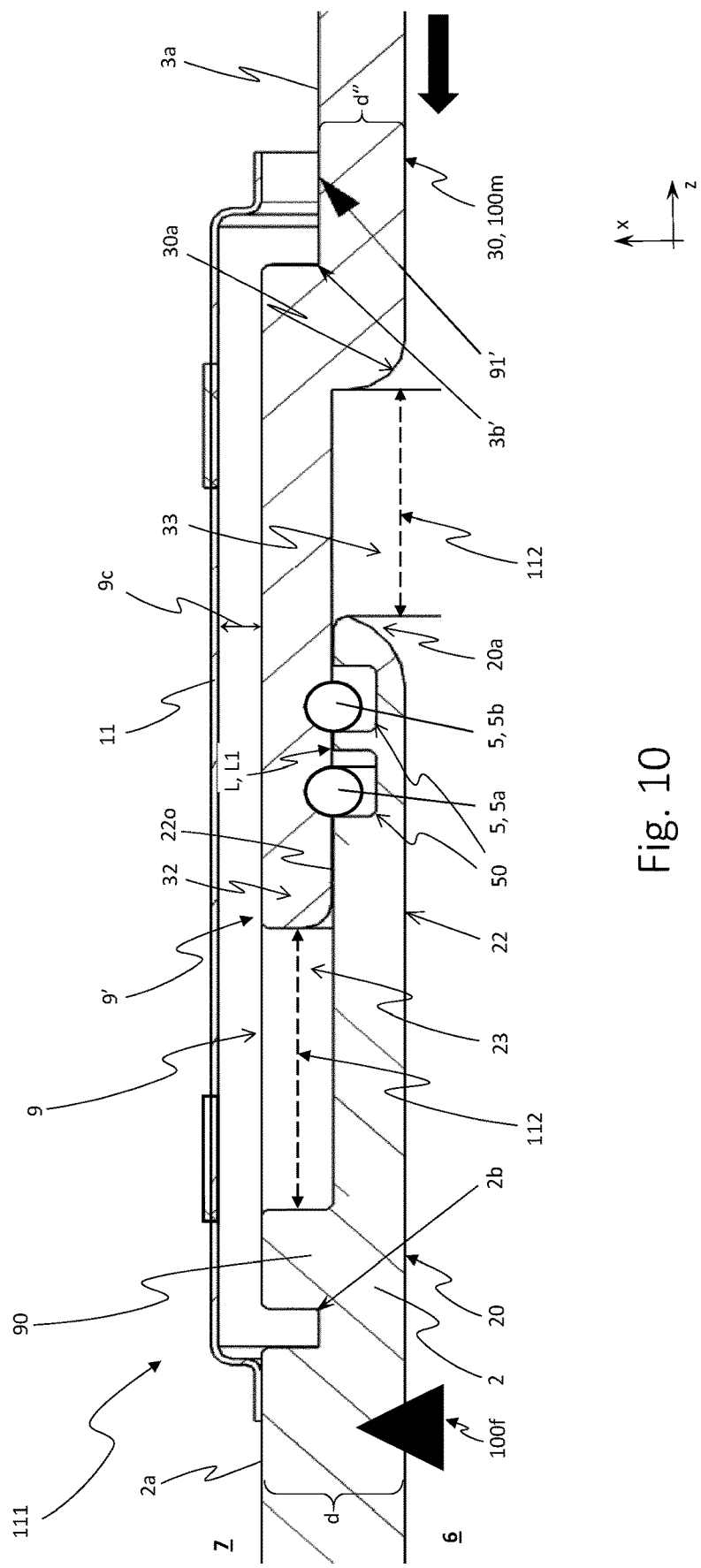
FIG. 10 a cross-sectional length view of a length compensation element.

In embodiments, the fixation element 108 can be star-shaped with cutouts that match the outer diameter of the single-phase enclosures 101A, 101B, 101C (or enclosure 1 or enclosure tubes 2, 3 as shown in FIG. 9, 10). The fixation element 108 can be placed in the center of the pipe 106. Phase fixation elements or bands 110 can be wrapped around each single-phase enclosure 101A, 101B, 101C or enclosure 1 or enclosure tubes 2, 3 and fixed to the triangular fixation element 108.

The phase fixation elements 109 can have a partial-circular ring shape for surroundingly fixing the single-phase enclosures 101A, 101B, 101C and for being mounted, in particular screwed, to the triangular fixation element 108.

In embodiments, the holdings means 103, 104, in particular the first and second holding means 103 and 104 and preferably the triangular fixation element 108, can hold the three single-phase enclosures 101A, 101B, 101C in a triangle, wherein the third phase C or its single-phase enclosure 101C can be placed centered at the bottom of the triangle (e.g. with an angular tolerance of e.g. +−15°) and the first phase A or its single-phase enclosure 101A and the second phase B or its single-phase enclosure 101 B are placed laterally to each other and above the third phase C or its single-phase enclosure 101C.

In embodiments thereof, first and second holding means 103, 104, in particular the triangular fixation element 108, can hold the three single-phase enclosures 101A, 101B, 101C in a triangle, which, when inscribed in a circle with 0° at the top, can have the first phase A at an angular position in a range of e.g. 285° to 310° and preferred of approximately 300°, the second phase B at an angular position in a range of e.g. 50° to 75° and preferred of approximately 60°, and the third phase C at an angular position in a range of e.g. 170° to 190° and preferred of approximately 180°. Widening the distance or angle between the phase enclosures 101A and 101B has the advantage to provide more space for an optional supply duct 114.

In embodiments, a supply duct 114 can be arranged in a free space, preferably on an upper side and/or between the single-phase enclosures 101A, 101B, 101C, and can be suitable for receiving at least one selected from the group consisting of: power cable, network cable, fiber-optic cable, gas pressure supply tube, other media supply line, and other low-voltage cable. Thus, the supply duct 114 can be placed in the gap between the phase enclosures 101A and 101B on top and fixed to the triangular fixation element 108 and can run in parallel to the gas-insulated line 100.

In embodiments, the holdings means 103, 104, in particular the first and second holding means 103 and 104 and preferably their triangular fixation element 108, can each hold a first roller 105a placed in a gap to the left and a second roller 105b placed in a gap to the right of the third phase C or its single-phase enclosure 101C, wherein a height of the first and second roller 105a, 105b is chosen to be suitable to carry the weight of the section or line-segment module 102 of the gas-insulated line 100, in particular a height suitable to touch an inside surface of a pipe 106.

In embodiments, the first and second holding means 103, 104 can each comprise the first moving means 105a, in particular the first roller 105a, arranged at an angular position, when inscribed in a circle with 0° at the top, in a range of e.g. 110° to 135° and preferred of approximately 120°, and the second moving means 105b, in particular the second roller 105b, arranged at an angular position in a range of e.g. 225° to 250° and preferred of approximately 240°.

Figure 5:
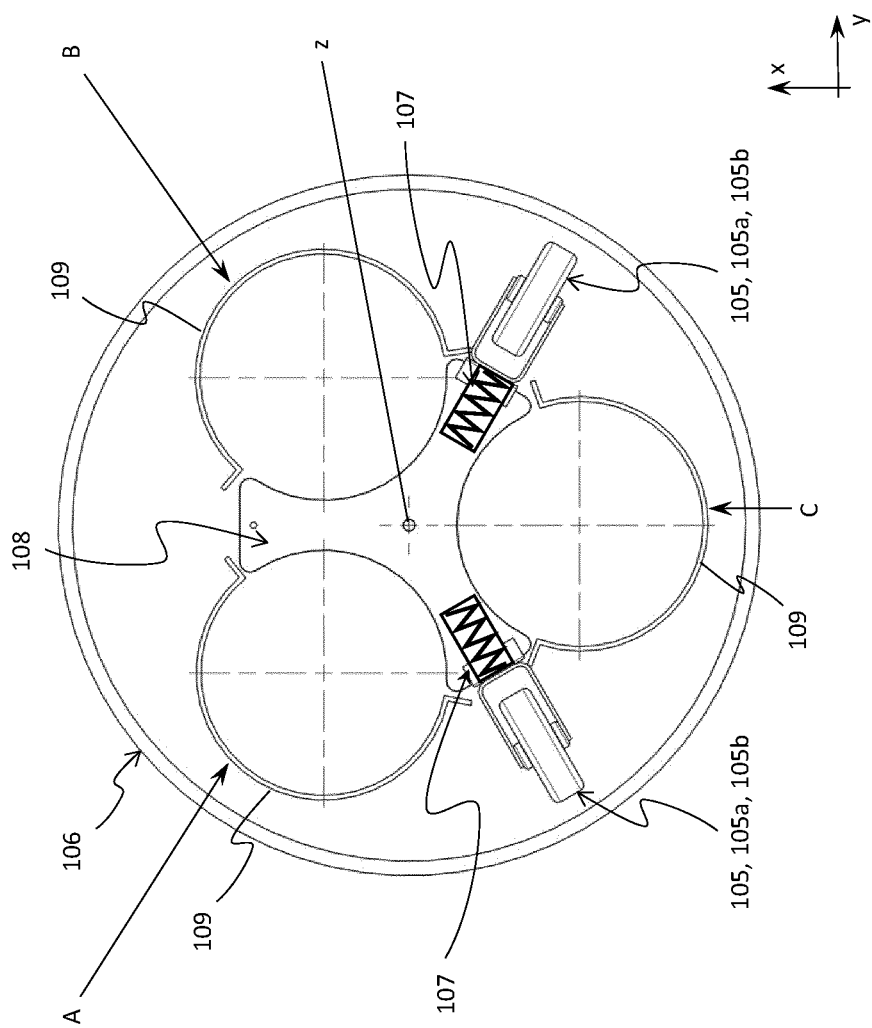
FIG. 5 a front view of a triangular fixation with a three-phase fixation element and spring-loaded rollers.

As shown in FIGS. 2 and 5, the moving means 105, in particular a first roller 105a; 105c fixed to the first holding means 103 and a second roller 105b; 105d fixed to the second holding means 104, can be equipped with a spring mechanism 107 to provide a resilient suspension for the line-segment module 102. As an alternative or in addition, the moving means 105 or rollers 105a, 105c; 105b, 105d can have a resilient surface layer, e.g. of 4 mm or more thickness, which also provides or contributes to the resilient suspension for the line-segment module 102. Thereby, the spring 107 and/or resilient surface layer of each roller 105a, 105b (and similar 105c, 105d in FIGS. 7 to 8) can balance the weight of the line-segment module 102 on both rollers 105a, 105b and compensate for bottom unevenness, obstacles, etc. The resilient force in normal position can be chosen similar to half the weight of the line-segment module 102.

Figure 6:
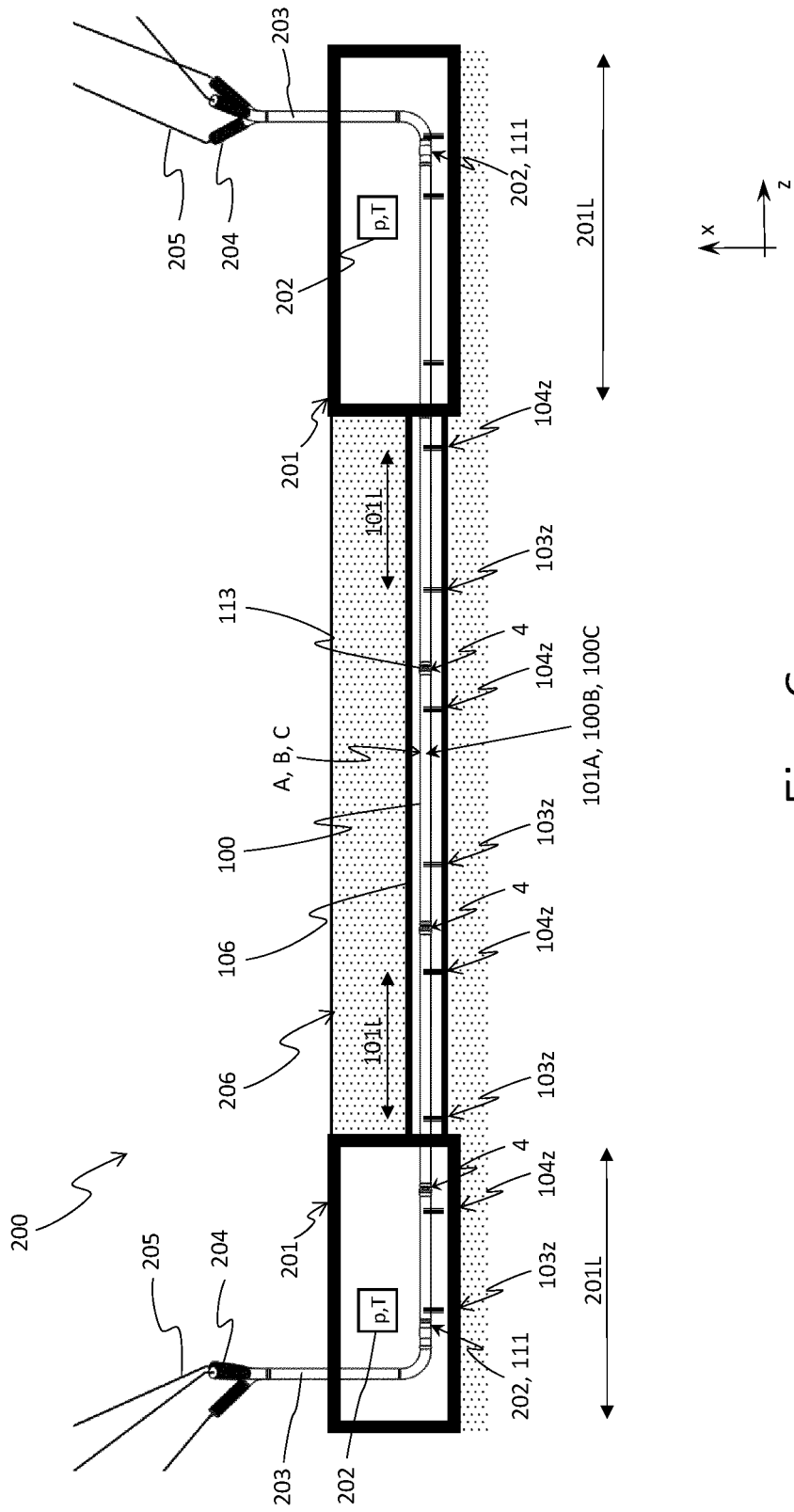
FIG. 6 a cross-sectional length view of a system comprising a gas-insulated line in a linear arrangement inside an underground rectangular tunnel.
Figure 7:
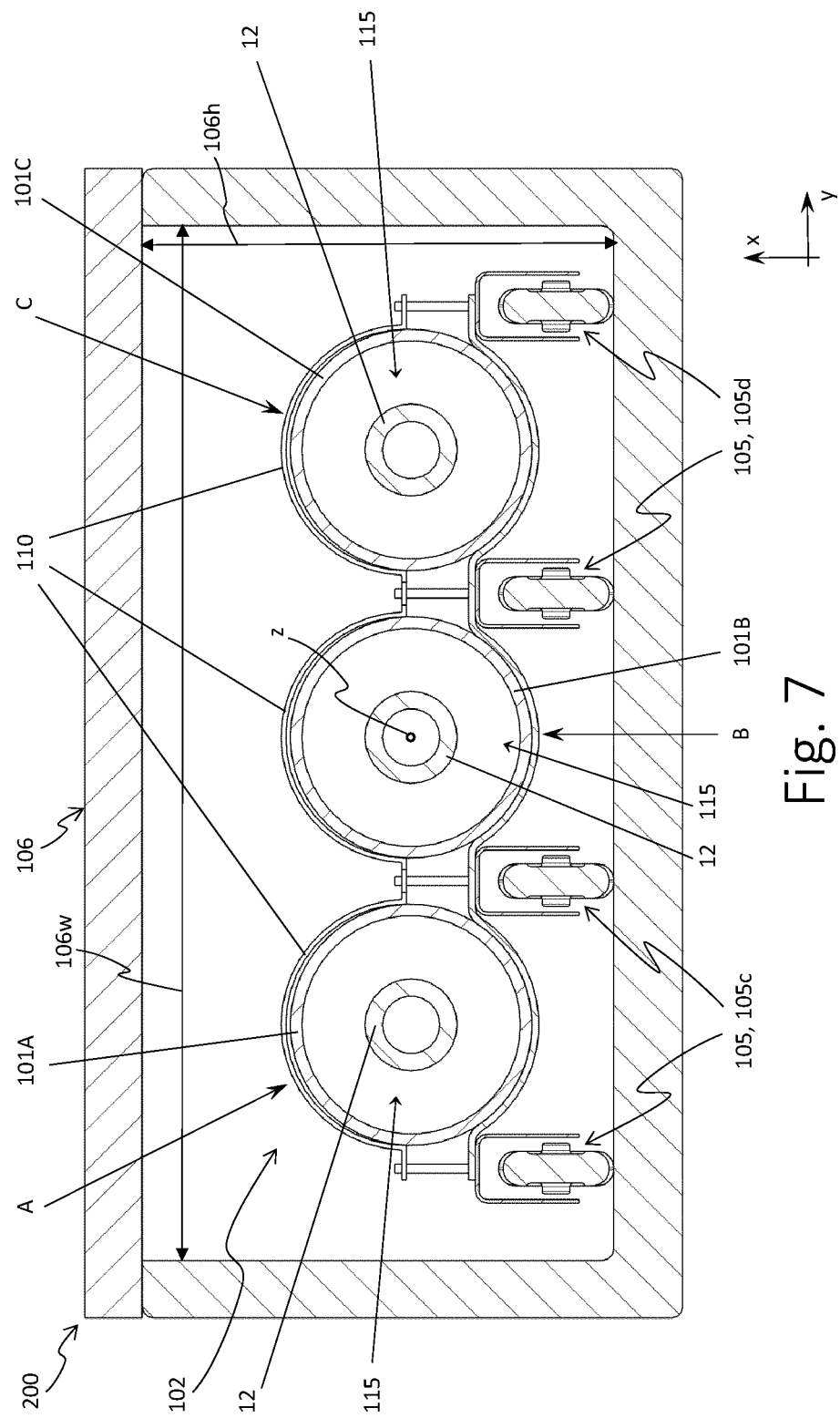
FIG. 7 a cross-sectional view of a linear arrangement of three single-phase-encapsulated gas-insulated lines in a tunnel.
Figure 8:
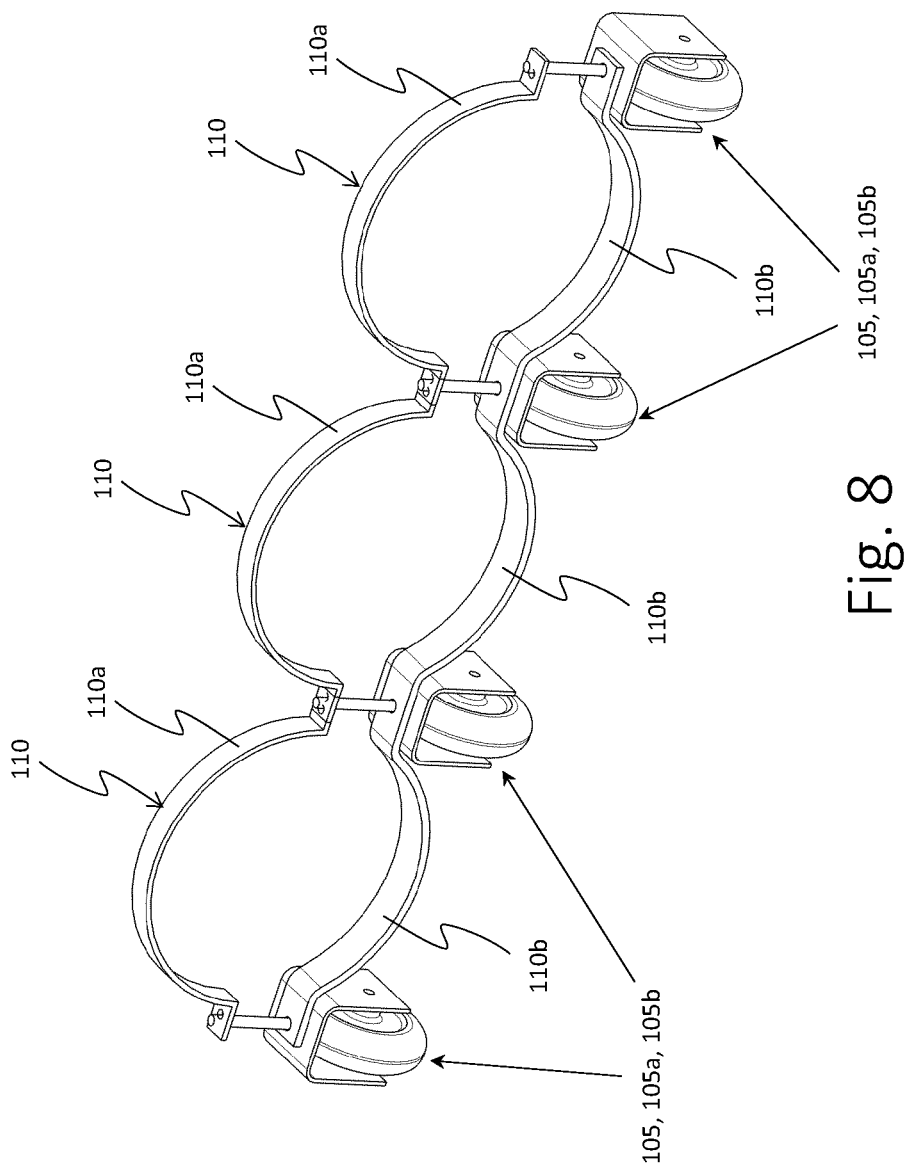
FIG. 8 a perspective view of a linear fixation with a three-phase fixation element and rollers.

As shown in FIGS. 6 to 8, the gas-insulated line 100 or its line-segment modules 102 can comprise three phases A, B, C with single-phase enclosures 101A, 101B, 101C, wherein the holding means 103, 104, in particular the first and second holding means 103, 104, hold the three phases A, B, C in a linear arrangement, preferably side-by-side. In addition, at least a fourth phase, e.g. a reserve phase, can be arranged in the line-segment module 102 and can be held by the (first and second) holding means 103, 104 in the linear arrangement, As shown in FIGS. 7 to 8, each holding means 103, 104, in particular the first and second holding means 103 and 104, can comprise three phase fixation elements 110 fixed side-by-side to one another. In embodiments, each phase fixation element 110 can comprise a partial-circular upper holding ring 110a and a partial-circular lower holding ring 110b for embracing and thereby fixing the single-phase enclosure 101A, 101B, 101C of the corresponding phase A, B, C.

Each holding means 103, 104 can comprise moving means 105, in particular rollers 105c, 105d, mounted at lateral end positions and/or at intermediate positions between phase fixation elements 109 of each holding means 103, 104, respectively.

The system 200 is further and exemplarily discussed with respect to FIG. 1 or FIG. 6. As indicated therein, each line-segment module 102 and thus the assembly bled gas-insulated line 106 as a whole can rest on the rollers 105a, 105b; 105c, 105d. The rollers 105a, 105b; 105c, 105d can be placed with certain spacings, e.g. evenly spaced, along the gas-insulated line 100. Preferred spacings can be every few meters.

In embodiments of the system 200, the confined space 106 is not accessible for personnel in upright position or is inaccessible to personnel. Preferably, the confined space 106 can be connected to at least one manhole 201 that is or are accessible by personnel for installing, maintaining and/or removing line-segment modules 102.

A pipe 106 (or tunnel or other laterally confined space 106) can be laid above or below ground level 106 along the planned path for the gas-insulated line 100. The pipe 106 can be sealed and connected on each end to a manhole 201. Additional manholes (not shown) may be used along the gas-insulated line 100 every few 100 m or at every turn. The manholes 201 at each end are used to connect the gas-insulated line 100 to e.g. air-insulated lines 205 via bushings 204 and/or vertical gas-insulated line sections 203, to other switchgear components or a substation, or to high-voltage cables via cable terminations (not shown). The pipe 106 is preferably clean on the inside and water tight. The system 200 as a whole can be an energy transmission and distribution system 200.

The manholes 201 are used for assembly of the gas-insulated line 100 in sections or segments 101, in particular line-segment modules 102. Each section or segment 101 or line-segment module 102 of a three-phase gas-insulated line 100, e.g. pre-assembled according to FIG. 2, can have a length of several meters and is lowered into the manhole 201. Pre-assembly or assembly of the line-segment module 102 as disclosed herein may also be done inside the manhole 201. The rollers 105a, 105b are then placed on the inside of the pipe 106, and the GIL section 101 or line-segment module 102 is then rolled into the pipe 106 until the ends reach the pipe entrance. At this point, the next GIL section or line-segment module 102 is lowered into the manhole 201 and all three phases A, B, C and an optional supply duct 114 are connected to the previous line-segment module 102. The assembly is then pushed further into the pipe 106 and the process repeats. For this process, the length 201L of the manhole 201 can be chosen longer than the length 101L of the GIL section 101 or line-segment module 102. The manhole length can be chosen e.g. in a range of 6 m to 14 m and preferred 6 m to 8 m, and the module length 101L can be chosen e.g. in a range of 2 m to 12 m, preferred 4 m to 10 m.

In embodiments of the system 200, the confined space 106 can e.g. be selected from the group consisting of: a pipe 106, an existing unused pipe, a water pipe, a sewage pipe, a tunnel 106, an underground tunnel, a tunnel in soil, a tunnel underneath pavement, and combinations thereof.

The at least one manhole 201 can be equipped with manhole equipment 202 e.g. selected from the group consisting of: a mounting unit for the line-segment modules 102, a dismantling unit for the line-segment modules 102, a connection unit for connecting line-segment modules 102 together and/or to length compensation elements 111 and/or to flexible-angle elements 113, a gas-filling device, a monitoring device for supervision of the gas-insulated line 100 during operation, an air cooling and blowing equipment, and combinations thereof.

Slim Flange Design

The co-pending International Application PCT/EP2020/070540 filed on the same date by the same applicant, shall herewith be incorporated by reference in its entirety into this application. It refers to a slim integrated flange design. Incorporation by reference includes the general description, all FIGS. 1-6 and the related description, and all claims, which are herewith deemed included by reference into the description as clauses.

The slim flange design 4 is exemplarily shown in FIG. 9. Each single-phase enclosure 101A, 101B, 101C of the gas-insulated line 100 can comprise a first enclosure tube 2 and a second enclosure tube 3, both having a longitudinal axis z and a radial thickness d, and therebetween a connection portion 4 for providing a gas tight connection between a first end 20 of the first enclosure tube 2 and a second end 30 of the second enclosure tube 3, wherein the connection portion 4 provides a sealing element 5; 5a, 5b between the first end 20 and the second end 30 in such a manner that a gas-escape path L can be sealed in a gas-tight manner, wherein the gas-escape path L is formed between the first end 20 and the second end 30 and starts at an inside 6 of the first and second enclosure tube 2, 3 and ends at an outside 7 of the first and second enclosure tube 2, 3, the gas-escape path L has a first segment L1 running along a direction having a directional component parallel to the longitudinal axis z, and the sealing element 5; 5a, 5b is provided in the first segment L1.

In embodiments, the first end 20 can comprise a first connection face 21 and the second end 30 can comprise a mating second connection face 31, and the gas-escape path L can be formed between the first connection face 21 and the second connection face 31.

In another aspect of the integrated flange design 4, each single-phase enclosure 101A, 101B, 101C of the gas-insulated line 100 can comprise a first enclosure tube 2 and a second enclosure tube 3, both having a longitudinal axis z and a radial thickness d, and therebetween a connection portion 4 for providing a gas-tight connection between a first end 20 of the first enclosure tube 2 and a second end 30 of the second enclosure tube 3, wherein a first connection face 21, in particular a first protrusion 22 and/or a first recession 23, is or are formed or machined into the first end 20, and a second mating connection face 31, in particular a second protrusion 32 and/or a second recession 33, is or are formed or machined into the second end 30.

In embodiments of the integrated flange design 4, before forming or machining the first and second connection face 21, 31, the first end 20 has the same inner and outer diameter as the first enclosure tube 2; and/or the second end 20 has the same inner and outer diameter as the second enclosure tube 3; and/or the first end 20 and the second end 30 have the same inner and outer diameter, respectively. In particular, the first and second enclosure tubes 2, 3 can be made from metal and can have a thickness of several mm, preferred in a range of 6 mm to 15 mm, more preferred 8 to 12 mm.

In embodiments, the connection portion 4 comprises a bracket 9, 9' surrounding the first end 20 and the second end 30, for providing an axial holding force for holding the first end 20 and the second end 30 together.

Embodiments of the gas-insulated line 100 disclosed herein also refer to a length compensation element or unit 111. Thermal expansion of the gas-insulated line 100 during operation can be compensated by providing: a first longitudinal fixation position 100f, in particular first end position 100f, at which the gas-insulated line 100 is fixedly mounted to a first reference location, a second longitudinal fixation position 100g, in particular second end position 100g, at which the gas-insulated line 100 is fixedly mounted to a second reference location, there-between a length compensation element 111 being arranged in the gas-insulated line 100, in particular between two line-segment modules 102, and the moving means 105, in particular rollers 105a, 105b; 105c, 105d, of the line-segment modules 102, which are arranged between the first and second longitudinal fixation positions 100f, 100g, being unblocked for allowing for small movements due to thermal expansion or contraction of the gas-insulated line 100 between the first and second longitudinal fixation positions 100f, 100g.

In embodiments, each single-phase enclosure 101A, 101B, 101C can comprise at least one length compensation element 111 arranged at one of the connection portions 4 of the first and second enclosure tubes 2, 3, wherein the first segment L1 of the gas-escape path L is running parallel to the longitudinal axis z of the single-phase enclosure 101A, 101B, 101C, and at both ends of the first segment L1 an axial expansion gap 112 is provided for allowing relative movement of the first end 20 of the first enclosure tube 2 and the second end 30 of the second enclosure tube 3, in particular for compensating thermal elongation or contraction or axial length tolerances of the first and/or second enclosure tubes 2, 3 without compromising the gas-tight sealing between the first end 2 and the second end 3. Favorable, the movement means or rollers 105; 105a, 105b, 105c, 105d are installed permanently and remain unblocked during the whole lifetime of the gas-insulated line 100, in particular for compensating thermal expansion after installation or during operation of the gas-insulated line 100.

LIST OF DESIGNATIONS

100 gas-insulated line, gas-insulated apparatus
100d diameter of gas-insulated line, outer diameter, enveloping diameter
100h height of gas-insulated line, outer height, maximal height
100w width of gas-insulated line, outer width, maximal width
101 line-segment
101A, 101B, 101C single-phase enclosures
101L length of line-segment, length of line-segment module
102 line-segment module
102e longitudinal end position of line-segment module
103 first holding means
103z first longitudinal position
104 second holding means
104z second longitudinal position
105 moving means
105a first moving means, first roller
105b second moving means, second roller
105c moving means, roller(s)
105d moving means, roller(s)
106 confined space, pipe, tunnel
106d diameter of confined space, inner diameter, minimal diameter
106h height of confined space, inner height, minimal height
106w width of confined space, inner width, minimal width
107 spring mechanism for line-segment module
108 triangular fixation element
108a mounting means
109 phase fixation element
110 phase fixation element
110a partial-circular upper holding ring
110b partial-circular lower holding ring
111 length compensation element or unit
112 axial expansion gap
113 flexible-angle element or unit
114 supply duct
13 insulation gas compartment
200 system comprising gas-insulated line arranged in confined space
201 manhole
201L manhole length
202 manhole equipment
203 vertical gas-insulated line section
204 bushing
205 high-voltage or medium-voltage line (gas-insulated or air-insulated)
206 ground level
A, B, C phases, single-encapsulated phases
x, y radial direction of the enclosure or of the medium-voltage or high-voltage apparatus
z longitudinal axis of the enclosure or of the medium-voltage or high-voltage apparatus
Slim Flange Design
1 gas-tight enclosure, metal enclosure
1A busbar, busduct, busduct segment, medium-voltage apparatus, high-volt-age apparatus
2 first enclosure tube
2a outside face of first enclosure tube
2b first indenture in 2a, rectangular groove
20 first end of first enclosure tube
21 first connection face of first end 22 first protrusion of first connection face at inside of enclosure
22i inner face of first protrusion
22o outer face of first protrusion
23 first recession of first connection face at outside of enclosure
3 second enclosure tube
3a outside face of second enclosure tube
3b, 3b' second indenture in 3a, rectangular groove
30 second end of second enclosure tube
30a rounded edges
31 second connection face of second end
32 second protrusion of second connection face at outside of enclosure
33 second recession of second connection face at inside of enclosure
4 connection portion
4a first insert part of connection portion
4b second insert part of connection portion
5 sealing element
5a first sealing ring, outside sealing ring
5b second sealing ring, inside sealing ring
50 sealing groove
6 inside of the enclosure tubes
7 outside of the enclosure tubes
8 spacer, post-type insulator, disk-shaped insulator, supporting insulator, compartment insulator
80 spacer groove
9 bracket
9' prolonged bracket, sliding-tolerant bracket
9a axial slit in bracket
9b axial extension of bracket, bracket width
9c thickness of bracket (in radial direction)
90 first rim of bracket
91 second rim of bracket
91' modified second rim, sliding rim of bracket
10 securing bar
11 heat shrink tube
12 conductor
13 insulation gas compartment
14 insert connection, welded connection
100f first longitudinal fixation position
100g second longitudinal fixation position
100m movable enclosure part
111 length compensation element, length compensation unit
112 axial expansion gap
d radial thickness of the enclosure tubes or of their ends
d' radial thickness of connection portion (insert) of enclosure tubes
d" reduced radial thickness of enclosure tube
L gas-escape path
L1 first segment of gas-escape path with axial directional component
L2 second segment of gas-escape path with radial directional component
L2i inner second segment of gas-escape path starting from inside of enclosure
L2o outer second segment of gas-escape path ending at outside of enclosure

The invention claimed is:

1. A gas-insulated line having a longitudinal axis, comprising phases with separately gas-tight single-phase enclosures that are aligned parallel to one another, and being segmented into line segments having a segment length, wherein at least one of the line segments comprises:

at least one holding means arranged at at least one longitudinal position of the line segment for holding the single-phase enclosures of the line segment relative to one another, thereby mounting the single-phase enclosures of the line segment together and forming a unitary line-segment module, and the line-segment module comprises moving means for facilitating movement of the line-segment module, wherein the moving means comprise rollers for supporting and moving the line-segment module.

2. The gas-insulated line according to claim 1, comprising:

a first holding means at a first longitudinal position of the line segment for holding the single-phase enclosures of the line segment relative to one another at the first longitudinal position, a second holding means at a second longitudinal position of the line segment for holding the single-phase enclosures of the line segment relative to one another at the second longitudinal position, and thereby mounting the single-phase enclosures of the line segment together and forming the unitary line-segment module.

3. The gas-insulated line according to claim 1, wherein the moving means are arranged in each holding means and are further adapted to support and allow rolling the line-segment module in a confined space, and the confined space is not accessible for personnel in upright position or is inaccessible to personnel.

4. The gas-insulated line according to claim 1, wherein the moving means, in particular a first roller and a second roller in each holding means, are mounted permanently on the line-segment module.

5. The gas-insulated line according to claim 1, wherein the moving means are mounted for at least one of: inserting the line-segment module into the confined space during installation, removing the line-segment module out of the confined space for maintenance or repair, compensating thermal expansion during operation of the gas-insulated line.

6. The gas-insulated line according to claim 1, wherein in each holding means the moving means, in particular a first roller and a second roller in each holding means, are equipped with a spring mechanism or have a resilient surface layer to provide a resilient suspension for the line-segment module.

7. The gas-insulated line according to claim 1, comprising three phases with single-phase enclosures, wherein the first and second holding means hold the three phases in a triangular arrangement, wherein each holding means comprises a triangular fixation element, that is shaped and arranged to fit in an intermediate volume between the single-phase enclosures and provides mounting means for mounting phase fixation elements and for mounting the moving means thereon.

8. The gas-insulated line according to claim 7, wherein the first and second holding means hold the three single-phase enclosures in a triangle, wherein the three phases comprise a first phase A, a second phase B, and a third phase C, wherein the third phase C is placed centered at the bottom and the first phase A and the second phase B are placed laterally to each other and above the third phase C, and each holding means holds a first moving means or roller placed in a gap to the left of the third phase C and a second moving means or roller to the right of the third phase C, wherein a height of the first and second roller is chosen to be suitable to carry the weight of the line-segment module.

9. The gas-insulated line according to claim 2, comprising at least three phases with single-phase enclosures, and the first and second holding means hold the three phases in a linear arrangement, wherein each holding means comprises three phase fixation elements fixed side-by-side to one another.

10. The gas-insulated line according to claim 9, wherein each holding means comprises the moving means, in particular, the rollers, mounted at lateral end positions and/or at intermediate positions between phase fixation elements of each holding means, respectively.

11. The gas-insulated line according to claim 1, wherein each single-phase enclosure of the gas-insulated line comprises a first enclosure tube and a second enclosure tube, both having a longitudinal axis and a radial thickness, and therebetween a connection portion for providing a gas-tight connection between a first end of the first enclosure tube and a second end of the second enclosure tube,
wherein the connection portion provides a sealing element between the first end and the second end in such a manner that a gas-escape path is sealed in a gas-tight manner,
the gas-escape path is formed between the first end and the second end and starts at an inside of the first and second enclosure tube and ends at an outside of the first and second enclosure tube,
the gas-escape path has a first segment running along a direction having a directional component parallel to the longitudinal axis, and
the sealing element is provided in the first segment.

12. The gas-insulated line according to claim 11, wherein the first end comprises a first connection face and the second end comprises a mating second connection face, and the gas-escape path is formed between the first connection face and the second connection face.

13. The gas-insulated line according to claim 1, wherein each single-phase enclosure of the gas-insulated line comprises a first enclosure tube and a second enclosure tube, both having a longitudinal axis and a radial thickness, and therebetween a connection portion for providing a gas-tight connection between a first end of the first enclosure tube and a second end of the second enclosure tube, wherein
a first connection face is formed or machined into the first end, and
a second mating connection face is formed or machined into the second end.

14. The gas-insulated line according to claim 11, wherein the connection portion comprises a bracket surrounding the first end and the second end, for providing an axial holding force for holding the first end and the second end together.

15. The gas-insulated line according to claim 1, wherein thermal expansion of the gas-insulated line during operation is compensated by providing:
a first longitudinal fixation position, at which the gas-insulated line is fixedly mounted to a first reference location,
a second longitudinal fixation position, at which the gas-insulated line is fixedly mounted to a second reference location,
there-between a length compensation element being arranged in the gas-insulated line, and
the moving means, in particular, the rollers, of the line-segment modules, which are arranged between the first and second longitudinal fixation positions, being unblocked for allowing for small movements due to thermal expansion or contraction of the gas-insulated line between the first and second longitudinal fixation positions.

16. The gas-insulated line according to claim 11, wherein each single-phase enclosure comprises at least one length compensation element arranged at one of the connection portions of the first and second enclosure tubes, wherein
the first segment of the gas-escape path is running parallel to the longitudinal axis of the single-phase enclosure, and
at both ends of the first segment an axial expansion gap is provided for allowing relative movement of the first end of the first enclosure tube and the second end of the second enclosure tube for compensating thermal elongation or contraction or axial length tolerances of the first and second enclosure tubes without compromising the gas-tight sealing between the first end and the second end.

17. The gas-insulated line according to claim 1, wherein a flexible-angle unit is present in the gas-insulated line to provide a non-straight gas-insulated line.

18. The gas-insulated line according to claim 1, wherein the segment length is in a range of 2 m to 12 m, preferred in a range of 4 m to 10 m.

19. The gas-insulated line according to claim 1, wherein a supply duct is arranged in a free space, preferably on an upper side of or between the single-phase enclosures, and is suitable for receiving at least one selected from the group consisting of: power cable, network cable, fiber-optic cable, gas pressure supply tube, other media supply line, and other low-voltage cable.

20. A system, in particular energy transmission and distribution system, comprising a gas-insulated line having line-segment modules according to claim 1, and a confined space providing a volume for accommodating the gas-insulated line, wherein the rollers are arranged in each holding means and are further adapted to support and allow rolling the line-segment module in the confined space, and the confined space is not accessible for personnel in upright position or is inaccessible to personnel.

21. The system according to claim 20, wherein the confined space is selected from the group consisting of: a pipe, an existing unused pipe, a water pipe, a sewage pipe, a tunnel, an underground tunnel, a tunnel in soil, a tunnel underneath pavement, and combinations thereof.

22. The system according to claim 20, wherein the gas-insulated line is in a multi-lateral arrangement of the phases, and the confined space has a clear cross section having an at least partially rounded shape or an at least partially circular shape; or wherein the gas-insulated line is in a linear arrangement of at least three phases, and the confined space has a clear cross section having a flat bottom.

23. The system according to claim 20, wherein the confined space is not accessible for personnel in upright position or is inaccessible to personnel.

24. The system according to claim 20, the system further comprising at least one manhole connected to the confined space and being accessible by personnel for installing, maintaining and/or removing line-segment modules, wherein the at least one manhole is at a starting position, an end position, and/or an intermediate position of the gas-insulated line and has a manhole length that is larger than the segment length.

25. The system according to claim 20, comprising further electrical energy transmission and distribution components, such as: a vertical gas-insulated line section, a bushing, a high-voltage or medium-voltage line isolated in gas or air, a switchgear component, a substation.

26. A method for installing a gas-insulated line according to claim 1 in a confined space, the gas-insulated line having a longitudinal axis, comprising phases with separately gas-tight single-phase enclosures, and being segmented into line segments, the method comprising the method elements of:
   a. aligning three single-phase enclosures of a line segment in parallel to one another,
   b. fixing the three single-phase enclosures together by a first holding means at a first longitudinal position of the line segment and by a second holding means at a second longitudinal position of the line segment, thereby forming a unitary line-segment module,
   c. connecting the line-segment module to an end of an already assembled portion of the gas-insulated line arranged in a confined space, e.g. a pipe or tunnel, and
   h. providing rollers permanently mounted on the at least one holding means, wherein the rollers are used for at least one of: inserting the line-segment module into the confined space during installation, removing the line-segment module out of the confined space for maintenance or repair, and compensating thermal expansion after installation or during operation of the gas-insulated line.

27. The method of claim 26, wherein the method element c. comprises the method elements d. and e.:
   d. inserting a formed or machined end of the line-segment module into a formed or machined end of the already assembled portion of the gas-insulated line for providing a flange-connection, and
   e. securing the flange-connection by an elastically openable and closable bracket, and optionally securing the bracket by a securing bar and/or a heat shrink tube.

28. The method of claim 26, comprising at least one method element of:
   f. filling a gas volume of the three single-phase enclosures with an insulation gas at an elevated gas pressure, in particular air, $SF_6$, an alternative gas or gas mixtures, or a combination thereof at an over-pressure in a range of 3 bar to 8 bar,
   g. arranging a supply duct on top of the line-segment module and connecting it to a mating end of a supply duct of the already assembled portion of the gas-insulated line, and
   i. moving or rolling the gas-insulated line with the connected line-segment module by a pushing or dragging force into the confined space.

29. The gas-insulated line according to claim 1, the line-segment module being or comprising at least one of: a gas-insulated busbar; a gas-insulated connection element; a gas-insulated switchgear such as disconnectors, circuit breakers; or other electrical component.

\* \* \* \* \*